United States Patent [19]

Rothermel

[11] 3,916,282

[45] Oct. 28, 1975

[54] POWER CONVERTER WITH RAPID RESPONSE CURRENT LIMITER

[75] Inventor: Ronald Richard Rothermel, Granada Hills, Calif.

[73] Assignee: Dimetrics, Inc., North Hollywood, Calif.

[22] Filed: Sept. 3, 1974

[21] Appl. No.: 502,548

[52] U.S. Cl. ................................. 321/2; 321/14
[51] Int. Cl.² .......................................... H02M 5/40
[58] Field of Search ................. 321/2, 4, 11–14, 321/19; 330/15, 207 P; 219/509

[56] References Cited
UNITED STATES PATENTS

| | | | |
|---|---|---|---|
| 3,341,765 | 9/1967 | Rogers et al. | 321/12 |
| 3,500,218 | 3/1970 | Burwen | 330/207 P |
| 3,614,587 | 10/1971 | Schwarz | 321/14 |
| 3,660,750 | 5/1972 | Businelli | 321/2 |
| 3,748,536 | 7/1973 | Andresen | 321/14 |
| 3,859,583 | 1/1975 | Reed | 321/12 |
| 3,859,586 | 1/1975 | Wadlington | 321/18 |

Primary Examiner—William M. Shoop
Attorney, Agent, or Firm—Ralph B. Pastoriza

[57] ABSTRACT

A rapid response current limiter is used in combination with first and second switching transistors and an output transformer winding connected to provide a power converter. The transistors are alternately switched by first and second square waves supplied to their base terminals, an input d.c. source being connected between a common junction of the switching transistors and a center tap of the transformer winding. Rapid response current limiting is accomplished by limiting the width of the driving square waves applied to the transistors to thereby limit the peak current that they conduct. This limiting of square wave width is accomplished by gating circuits which abruptly truncate the square wave causing the switching transistors to turn off whenever a sensed current in the circuit exceeds a given reference value. The current limiting acts virtually instantaneously so that the risk of burning out the switching transistors in the event of a sudden high current surge is substantially eliminated.

5 Claims, 4 Drawing Figures

POWER CONVERTER WITH RAPID RESPONSE CURRENT LIMITER

This invention relates generally to power supplies and more particularly to a power converter with a very rapid response current limiting circuit incorporated therein.

BACKGROUND OF THE INVENTION

In various known types of power supplies there is employed a power converter for providing a low voltage d.c. output from a high voltage d.c. input. The low voltage output is rectified and filtered to provide current to a load such as a welding arc. The high voltage d.c. input to the power converter may be derived from a conventional 120 volts 60 cycles source by utilizing a bridge rectifier and filter.

In circuits of the foregoing type, regulation of the current can be accomplished by pulse width modulating the drive signals utilized to switch the transistors in the power converter. Thus, if the current exceeds a desired operating value, an error signal is used to effectively decrease the pulse width of the square waves so that the switching transistors in the power converter are caused to alternately conduct for shorter periods of time thus effectively decreasing the current. On the other hand, if the current drops below a desired level in the load, the width of the square wave pulses switching the transistors is increased thereby causing the transistors to conduct for greater periods of time and thus generally increase the current back to its desired regulated level.

While such regulating means are effective, they usually require several cycles to take effect; that is, there is a substantial lag time between the undesired change in current level in the load and correction thereof by the regulator. This "lag time" is not particularly serious insofar as the load is concerned but it does become serious in the power converter itself since a sudden increase in current can burn out one or both of the switching transistors.

BRIEF DESCRIPTION OF THE PRESENT INVENTION

With the foregoing in mind, the present invention contemplates a rapid response current limiter in combination with a power converter such as the type employed in the aforementioned power supplies which functions effectively to limit the current in a very short period of time; for example, within a very small fraction of a half cycle, such as one or two microseconds to thus minimize the risk of burning out the transistors.

Briefly, the invention comtemplates, in combination, first and second switching transistors and an output transformer winding connecting to provide a power converter when energized by a d.c. voltage and when the transistors are alternately switched by first and second square waves applied to their base terminals. A current sensing resistor is connected to the converter to provide a current signal constituting a function of the current passing through the switching transistor. A peak current reference signal in turn is provided together with limiter means responsive to the current signal and to the reference signal to limit the width of the square wave applied to the base terminals of the switching transistors whenever the instantaneous current signal exceeds the value of the reference signal. The action of the current limiter thus automatically limits the instantaneous peak current passing through the switching transistors to the valve determined by the peak current reference signal.

It should be understood that the foregoing limiting occurs instantaneously (within one or two microseconds) whenever the transistor current exceeds the predetermined limit. In this respect, it is independent of the normal type of current regulation to a load which also functions by pulse width modulation but which takes several cycles. Essentially, the current limiter is directly responsive to any excessive current passing through the transistors while the normal regulation circuit is responsive to a change in the load current. Both controls function well together to provide a greatly improved overall power supply.

BRIEF DESCRIPTION OF THE DRAWINGS

A better understanding of this invention will be had by now referring to the accompanying drawings in which.

DETAILED DESCRIPTION OF THE INVENTION

Figure 1:
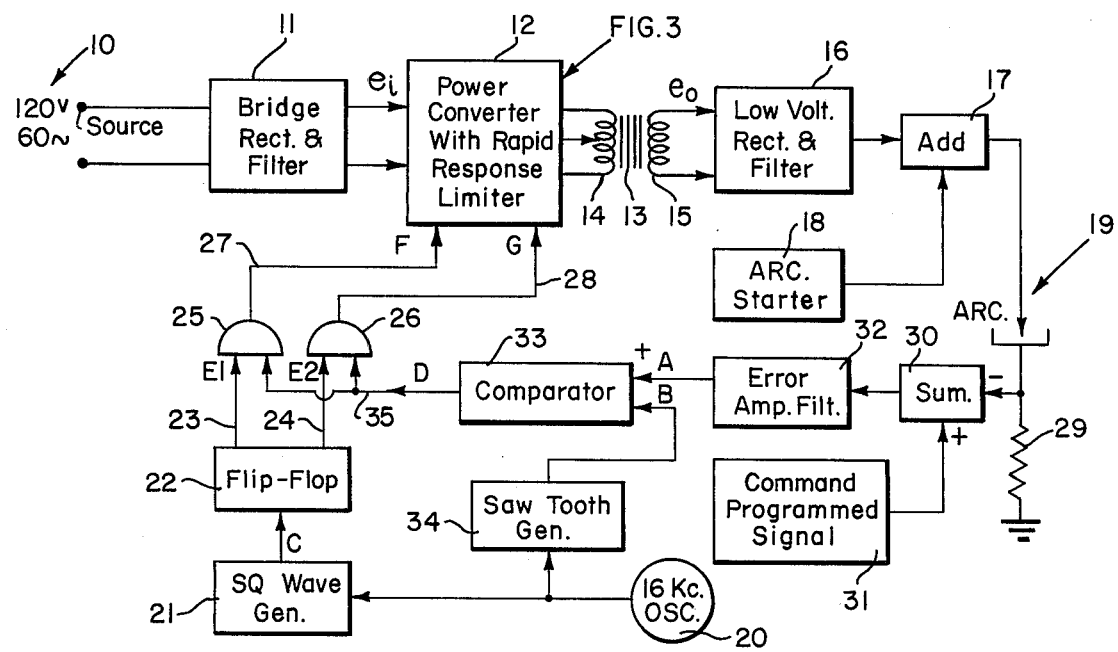
FIG. 1 is an overall block diagram of a power supply incorporating a power converter with the rapid response limiter in accord with the present invention.

Referring first to FIG. 1 there is shown a power supply circuit which, in the example set forth for illustrative purposes, provides current for a welding operation. In this respect, the proper current is derived from a conventional 120 volt 60 cycle source. It should be understood in welding operations that large current surges can exist which often prove detrimental to the power supply in that switching transistors used in the power converter portion thereof are blown out. Thus, the present invention is particularly well suited as a power supply for welding operations. It should be understood, however, that the principles involved would be useful in a power supplied utilized for other purposes.

Referring to the upper left portion of FIG. 1 the conventional 120 volt 60 cylce source is indicated at 10. A bridge rectifier and filter 11 provides a high d.c. voltage source $e_i$ for a power converter 12

As will become clearer as the description proceeds, the power converter 12 includes first and second switching transistors and an output transformer, the latter being shown at 13 This transformer includes primary and secondary windings 14 and 15, an output a.c. signal being taken from the secondary 15 as indicated at $e_o$. This high frequency low voltage output from the power converter is passed through a low voltage rectifier and filter 16 to a first input of an add circuit 17. The second input to the add circuit 17 connects from an arc starter 18. The arc starter 18 simply adds sufficient current to the output of the low voltage rectifier filter 16 to start the electric arc in the welding operations set forth by way of example. The arc load is indicated at 19.

The current provided the load 19 from the circuit described thus far is normally regulated to a programmed amount. This regulation means includes an oscillator 20 as shown in the center lower portion of FIG. 1 which might, for example, provide a 16kc signal. This signal is converted to a square wave by a square wave generator 21 in turn connecting to a flip-flop circuit 22. The flip-flop circuit 22 is switched back and forth by the square wave from the oscillator to provide first and second square wave 180° out of phase with each other at the two flip-flop output terminals 23 and 24. These first and second square waves then pass through first and second coincidence circuits 25 and 26 to output leads 27 and 28 in turn connecting to the power converter 12 for switching alternately the transistors in the power converter.

In the particular regulating means to be described in FIG. 1, regulation of the load current is accomplished by pulse width modulating the first and second square wave on the output leads 27 and 28.

The foregoing modulation is accomplished by deriving a signal from a sensing resistor 29 in series with the load 19 shown to the right in FIG. 1. This signal is in the form of a voltage level signal passed into a summing circuit 30 and constitutes a function of the d.c. current passing through the load. A command programmed signal source 31 also passes to the summing circuit 30 to provide an output signal to an error amplifier and filter 32. The voltage level signal passes from the error amplifier and filter 32 to a comparator 33. Comparator 33 has first and second inputs, the first input receiving the output from the oscillator 20 in the form of a saw tooth provided by a saw tooth generator 34. The second input receives the voltage level signal from the error amplifier 32.

The output of the comparator is shown at 35 and constitutes a series of square waves whose width vary with variations in the voltage level signal provided from the error amplifier 32. This series of square waves is passed to the second inputs of the coincidence circuits 25 and 26 as shown.

Figure 2:
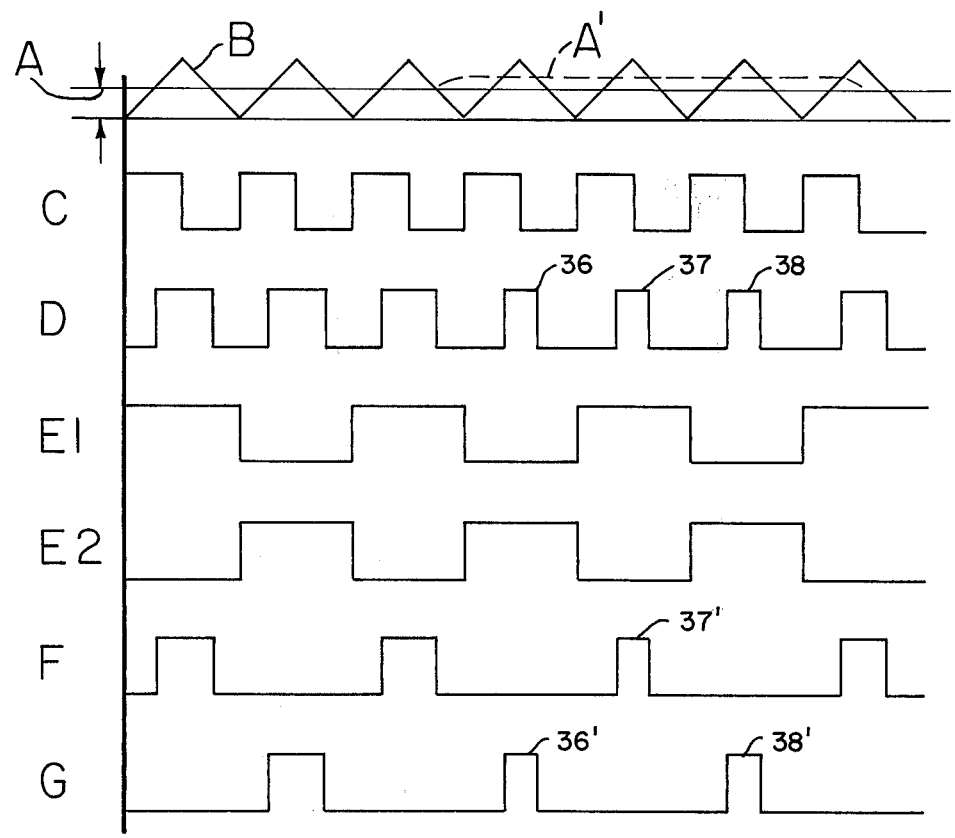
FIG. 2 illustrates a series of wave forms occurring in the circuit of FIG. 1 at correspondingly lettered locations.

Referring now to FIG. 2, the manner in which the above described components operate to regulate the load current will become clear. In FIG. 2, there are shown various lettered wave forms occurring at correspondingly lettered points in FIG. 1. Thus, the voltage level signal passed into the comparator 33 from the error amplifier 32 is shown at A while the saw tooth signal passed to the comparator 33 is shown at B.

Wave form C constitutes the output of the square wave generator 21 driven by the oscillator 20 for switching back and forth the flip-flop circuit 22.

Wave form D constitutes the series of square waves from the comparator 33 passed to the coincidence circuits 25 and 26. The square waves E1 and E2 illustrate respectively the output from each side of the flip-flop circuit occurring on leads 23 and 24, these signals being passed to the first inputs of the coincidence circuits 25 and 26.

Wave form F and G illustrate the first and second square waves on the lines 27 and 28 passed to the power converter 12 for switching the transistors.

The voltage level signal A has a value determined by the amplified difference between the command programmed signal from the block 31 and the signal from the sensing resistor 29. The comparator output signal D thus constitutes a series of square waves which are consistent in width so long as the voltage level signal A remains the same.

Assume for the sake of illustration that there is a sudden surge in current in the load which would cause the voltage level signal A to vary. Such variation is indicated at A' in FIG. 2. When this occurs, the output of the comparator shown by the series of square waves D changes such that the square waves decrease in width as indicated at 36, 37 and 38. It should be noted that the leading and trailing edges defining the pulse width of the series of square waves D coincide with the crossover points of the voltage level signal A with the saw tooth wave form B so that when the voltage level A moves up or down, the series of square waves at D vary in width accordingly.

The signals E1 and E2 essentially gate the series of square waves represented by signal D through the coincidence circuits 25 and 26 thereby providing the first and second square waves F and G. Thus, signal E1 from one side of the flip-flop 22 will gate the decreased width signal 37 to provide a correspondingly decreased width square wave in the signal F as indicated at 37'. Similarly, the signal E2 from the other side of the flip-flop will gate the decreased width signals 36 and 38 to provide corresponding signals 36' and 38' in the G signal.

As mentioned, the signals F and G serve to drive the switching transistors and since their width has been decreased, the transistors will be on for a decreased period of time thereby decreasing the current to the load to accomplish the regulation.

It will be evident from the above that the described regulation requires several cycles to take effect. The reason for this relatively long length of regulation time is the fact that the error signal is derived from the load current which is filtered by filter 16 and the error amplifier and filter block 32. These filters add time delays. It is possible, accordingly, that the switching transistors in the power converter could be burned out by a sudden increased current surge before the foregoing described regulation could be completed to limit the current to the load.

Figure 3:
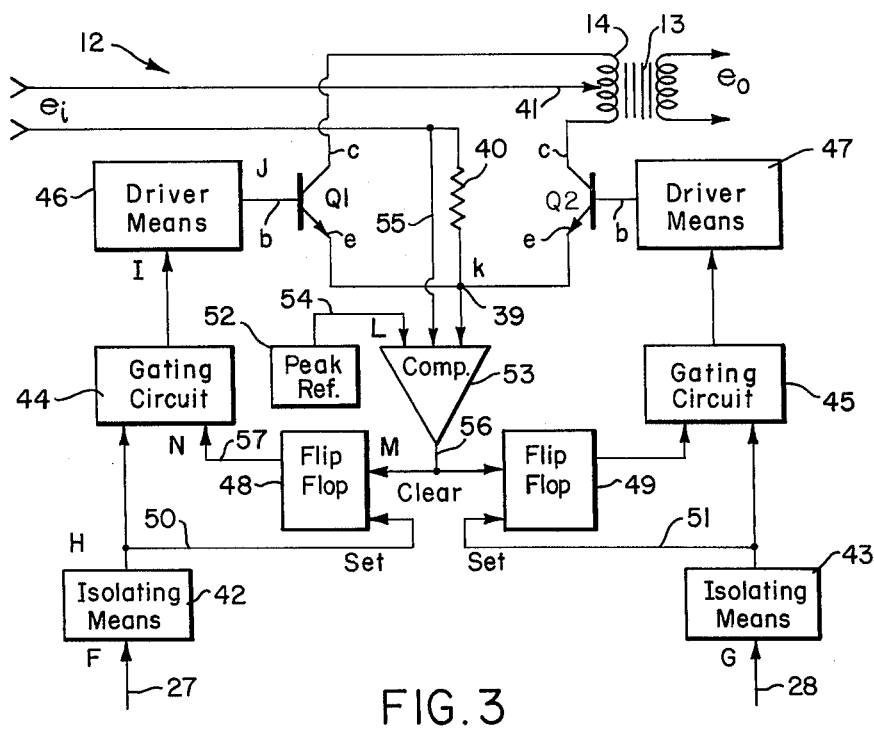
FIG. 3 is a detailed block diagram of the power converter portion of the circuit of FIG. 1.

Referring now to FIG. 3, there is shown in detail the power converter circuit in combination with the rapid response current limiter to overcome the above problem of possible transistor burn out.

Referring to FIG. 3, the first and second switching transistors making up the power converter are shown at Q1 and Q2 each having the usual base, collector, and emitter terminals designated by the letters $b$, $c$ and $e$ respectively. As shown, the collector terminals connect to opposite ends of the primary winding 14 for the transformer 13, while the emitter terminals connect to a common junction point 39. A current sensing resistor 40 has one end connected to the junction point 39 as shown. The input d.c. voltage for the power converter indicated at $e_1$ connects between the other side of the current sensing resistor 40 and a center tap 41 for the primary winding 14 of the transformer.

Referring to the lower portion of FIG. 3, the first and second square waves on lines 27 and 28 described in FIG. 1 pass into suitable isolating means 42 and 43 respectively. Each of these isolating means may constitute and optical coupler together with an inverter so that the inversion which takes place in the optical coupler is reinverted so that the signal at the output of the isolating means corresponds in all respects to the first and second square wave input signals 27 and 28.

As shown, these first and second square waves from the respective isolating means pass through first and second gating circuits 44 and 45 and thence to first and second driver means 46 and 47 connected to the base terminals of the transistors Q1 and Q2.

Cooperating with the gating circuits 44 and 45 are first and second flip-flop circuits 48 and 49 connected to receive the first and second square waves as by leads 50 and 51 to switch the flip-flops to a set state.

A peak current reference signal is provided by block 52 to a first input of a comparator 53 as shown at 54. Comparator 53 also has a second input connected across the sensing resistor 40 as by lead 55 and the connection to junction point 39. Any output signal from the comparator on line 56 connects to both flip-flop circuits 48 and 49 to switch them to a clear state. Output control signals are provided from each of the flip-flops which differ according to their set or clear states on output lines such as indicated at 57 connecting to the gating circuit 44, a similar line connecting to the gating circuit 45.

Since the components making up the rapid response current limiter described above are symmetrical for each of the transistors Q1 and Q2, description of the limiting of current in the transistor Q1 will suffice for both.

Figure 4:
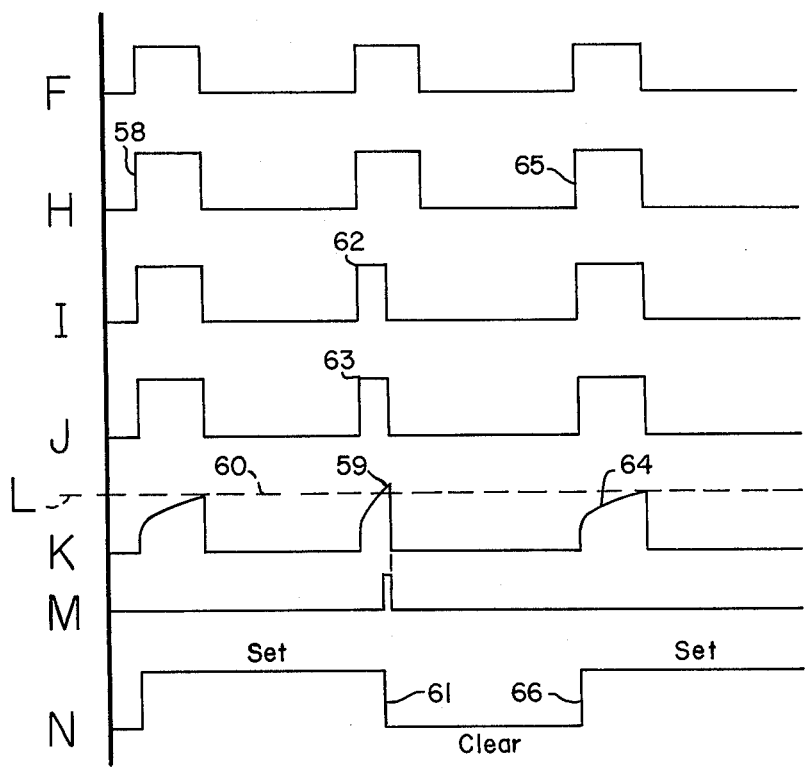
FIG. 4 illustrates a series of wave forms occurring at correspondingly lettered locations in the circuit of FIG. 3.

Considering first normal operation and with reference to FIG. 4, the square wave F on line 27 is reproduced from FIG. 2 and as shown is not modified in form by the isolating means 42 so that the wave form appearing at the point H in FIG. 3 is substantially the same as the square wave F. The leading edge of the square wave H as indicated at 58 switches the flip-flop 48 to its set state. In this state, the signal from the flip-flop on line 57 passing to the gating circuit 44 holds the gating circuit open so that the wave form H passes there through intact as shown by wave form I. As shown at the correspondingly lettered points in FIG. 3, this wave form I connects to the driver means which provides a driving wave form J which is the same as the wave form I to the base of the transistor Q1 turning this transistor on for the duration of the width of the wave form.

Switching on of the transistor Q1 completes a circuit from the center tap 41 connecting to one side of the input d.c. source, upper half of the primary winding 14, transistor Q1 to the junction point 39, and thence through current sensing resistor 40 to the other side of the d.c. source. As described, a similar operation takes place with respect to the transistor Q2, the same being lead 28 on by the wave form G on the lead 28 passing up through the isolating means 43, gating circuit 45 and driver means 47. When transistor Q2 is conducting, the circuit is completed from the center tap 41, the lower portion of winding 14, transistor Q2 to junction 39 and current sensing resistor 40.

Thus, in normal operation, the transistors Q1 and Q2 will be alternately switched and the output current from the transformer secondary winding will be determined by the width of the driving square waves for the transistors.

Referring once again to FIG. 4, the current signal passed into the comparator 53 from across the current sensing resistor 40 is indicated by the wave form K while the peak current reference signal is indicated by the level L. So long as the current signal K is below the reference signal L, the current passed by the transistors is safe and will not cause them to be burned out.

Assume now, however, that there is a sudden increase in the current passing through transistor Q1. This increase is indicated at 59 in FIG. 4 wherein it exceeds the reference current level 60. Upon this occurrence, there will immediately be provided an output signal from the comparator 53 indicated by the wave form M which is passed to both the flip-flop circuits 48 and 49 thereby switching them to a clear state. This switching is indicated by the wave form N at 61. When the flip-flop is in its clear state, the signal N on line 57 of FIG. 3 closes the gating circuit 44 thus instantaneously removing the drive signal causing transistor Q1 to abruptly turn off and thereby preventing possible failure.

The above is illustrated by the output signal 62 from the gating circuit 44 in wave form I wherein the width its set the square wave has been decreased. This decreased width is also reflected at the wave form J from the driver means so that the transistor Q1 is immediately caused to conduct for a lesser period of time than commanded by signal F thereby limiting the peak current passing therethrough as indicated at 59 to a valve ever so slightly above reference level 60.

Since the flip-flop is connected to receive the wave form H from the isolating means, it will be switched back to itsset state by the leading edge of the subsequent square waves such as the leading edge 65 of square wave H and as shown at 66 in FIG. 4, allowing drive to be restored for subsequent cycles.

It will be evident that the foregoing limiting of the current through the transistor Q1 occurs extremely rapidly; that is, within one or two microseconds.

It will also be evident that the current is limited to an absolute peak value determined by the reference signal.

As mentioned heretofore, the limiting of current through transistor Q2 is effected in the same manner.

From the foregoing description, it will be evident that the present invention has provided a vastly improved power supply wherein a rapid response current limiter is provided to prevent burn out of transistors. While the current limitation control works well in conjunction with the normal load current regulation described in FIG. 1, it should be understood that the rapid response current limit control could be used with a power converter in and of itself and need not be used in combination with the other known types of current controls.

While a pulse width modulation technique has been described for current control in both the general current regulating arrangement of FIG. 1 as well as in the rapid response limiter arrangment of FIG. 3, the controls are distinguished by the fact that in the normal current regulation by pulse width modulation, essentially an analog process is involved wherein changes in the load current are detected to effect the regulation whereas in the rapid response current limiter, a digital control is used responsive directly to a change in the transistor current.

It will be understood by those skilled in the art that while gating and coincidence circuits have been described, equivalent electrical circuits for accomplishing the desired results could be utilized. The overall invention accordingly is not to be thought of as limited to the specific example set forth.

What is claimed is:

1. A power converter with a rapid response current limiter comprising, in combination:

a. first and second switching transistors and an output transformer winding connected to provide a power converter when energized by a d.c. voltage and when said transistors are alternately switched by first and second square waves applied to their base terminals;

b. a current sensing resistor connected to said converter to provide a current signal constituting a function of the current passing through said switching transistors;

c. a peak current reference signal; and d. limiter means including comparator means receiving said current signal and reference signal and providing an output signal of very narrow pulse width of approximately one or two microseconds whenever said current signal exceeds the value of said reference signal; and, first and second flip-flop and associated gating means for passing said first and second square waves to said switching transistors, respectively, said flip-flops being connected to said comparator means and responsive to the presence of said output signal to close the gating means before a complete square wave can pass through the gating means to thereby truncate the width of the square waves applied to the base terminals of the switching transistors, said width being truncated at the instant that said current signal exceeds said reference signal thereby abruptly turning off said switching transistors thus limiting the absolute peak current passing through the transistors to a safe value determined by the reference signal.

2. A power converter with a rapid response current limiter comprising, in combination:

a. a source of d.c. voltage;

b. first and second switching transistors each having collector, emitter and base terminals;

c. a transformer having primary and secondary windings, the primary winding having its opposite ends connected to said collector terminals respectively, said emitter terminals connecting together at a common junction point;

d. a current sensing resistor connected to said junction point, said source of d.c. voltage being connected between the other end of said current sensing resistor and a center tap on said primary winding;

e. first and second square wave form generating means providing first and second square waves;

f. first and second driver means connected to the base terminals of said transistors respectively responsive to said first and second square waves from said generating means to alternately switch said transistors;

g. first gating means connected between said first square wave generating means and said first driver means and second gating means connected between said second square wave generating means and said second driver means;

h. a first flip-flop circuit connected to said first gating means and to said first square wave form generating means and a second flip-flop circuit connected to said second gating means and to said second square wave form generating means;

i. a peak current reference source; and, j. comparator means having inputs connected to said peak current reference source and across said sensing resistor respectively and having an output line connected to both said first and second flip-flop circuits, the leading edge of each of said first and second square waves from the first and second square wave generating means setting said first and second flip-flop circuits respectively to set states to hold said first and second gating means open to pass said first and second square waves to the first and second driver means respectively, any current at said junction point exceeding said peak current reference actuating said comparater means to provide an output signal to both said first and second flip-flop circuits to switch them to clear states to thereby close said gating means whereby the current flow through said switching transistors is blocked from exceeding the value of said peak current reference until the next leading edge of the square waves switches the flip-flop circuits back to their set states to again open the gating means.

3. The subject matter of claim 2, in which said source of d.c. voltage includes a bridge rectifier and filter connected to a 120 volt 60 cycle source, a low voltage rectifier and filter connected to said secondary winding of said transformer to provide an output d.c. current to a load, and in which said first and second square wave generating means include:

a. a high frequency oscillator means;

b. a flip-flop circuit connected to be switched back and forth by said oscillator means to provide first and second square waves 180° out of phase with each other at its two output sides;

c. regulating means responsive to said d.c. current passed to a load for pulse width modulating said first and second square waves to provide said first and second square waves passed to said first and second gating means respectively whereby the output d.c. current to a load is regulated to a desired average current value.

4. The subject matter of claim 3, in which said regulating means includes a sensing resistor in series with the load to which said d.c. current is passed to provide a voltage level signal constituting a function of said d.c. current; a comparator having first and second inputs receiving respectively the high frequency from said oscillating means in the form of a saw tooth and said voltage level signal to provide at its output a series of square waves whose widths vary with variations in said voltage level signal; and first and second coincidence circuits receiving in first inputs said first and second square waves from said flip-flop outputs respectively and in their second inputs said series of square waves to thereby pulse width modulate said first and second square waves to effect said regulation to a desired current value.

5. The subject matter of claim 4, in which said oscillator means includes an oscillator having its output connected to a saw tooth generator for providing the first input to said comparator, said oscillator also connecting to a square wave generator for effecting the back and forth switching of said flip-flop circuit.

* * * * *